(12) United States Patent
Kokeguchi et al.

(10) Patent No.: US 11,285,903 B2
(45) Date of Patent: Mar. 29, 2022

(54) AIRBAG AND OCCUPANT RESTRAINT DEVICE

(71) Applicants: Honda Motor Co., Ltd., Tokyo (JP); Joyson Safety Systems Japan K.K., Tokyo (JP)

(72) Inventors: Akira Kokeguchi, Shiga (JP); Shinichi Takeuchi, Shiga (JP); Norihisa Okada, Shiga (JP); Hiroyuki Ito, Saitama (JP); Takashi Saso, Saitama (JP); Takayuki Shimizu, Saitama (JP)

(73) Assignees: Honda Motor Co., Ltd., Tokyo (JP); Joyson Safety Systems Japan K.K., Tokyo (JP)

( * ) Notice: Subject to any disclaimer, the term of this patent is extended or adjusted under 35 U.S.C. 154(b) by 59 days.

(21) Appl. No.: 16/816,025

(22) Filed: Mar. 11, 2020

(65) Prior Publication Data
US 2020/0290548 A1 Sep. 17, 2020

(30) Foreign Application Priority Data

Mar. 12, 2019 (JP) .............................. JP2019-045015
Mar. 29, 2019 (JP) .............................. JP2019-065627

(51) Int. Cl.
*B60R 21/207* (2006.01)
*B60R 21/233* (2006.01)

(52) U.S. Cl.
CPC .......... *B60R 21/207* (2013.01); *B60R 21/233* (2013.01)

(58) Field of Classification Search
CPC ................ B60R 21/207; B60R 21/233; B60R 2021/0048; B60R 2021/23146; B60R 21/231
See application file for complete search history.

(56) References Cited

U.S. PATENT DOCUMENTS

| 9,981,624 B2* | 5/2018 | Perlo ..................... B60R 21/207 |
| 2017/0028955 A1* | 2/2017 | Ohno ..................... B60R 21/207 |
| 2018/0126942 A1* | 5/2018 | Ohno ..................... B60R 21/237 |

FOREIGN PATENT DOCUMENTS

| EP | 1193141 A2 | 4/2002 |
| EP | 3098116 A1 | 11/2016 |
| JP | 2017-30373 A | 2/2017 |

(Continued)

OTHER PUBLICATIONS

EPO; Application No. 20157125.4; European Search Report dated May 29, 2020.

*Primary Examiner* — Karen Beck
(74) *Attorney, Agent, or Firm* — Fitch, Even, Tabin & Flannery LLP

(57) ABSTRACT

An airbag includes: a first inflatable section that is inflated and deployed forward from the upper portion of a seat back through the left side of a head of an occupant; a second inflatable section that is inflated and deployed forward from the upper portion of the seat back through the right side of the head of the occupant; and a third inflatable section that is continuous with lower portions of front portions of the first inflatable section and the second inflatable section and that is inflated and deployed in front of the chest of the occupant. The front portions of the first and second inflatable sections extend in directions intersecting the vehicle front-rear direction so as to be closer to each other toward the front side. The front portions meet each other at a front end of the airbag.

4 Claims, 5 Drawing Sheets

(56) References Cited

FOREIGN PATENT DOCUMENTS

| | | | |
|---|---|---|---|
| JP | 2017-30679 A | 2/2017 | |
| JP | 2017-43175 A | 3/2017 | |
| JP | 2017-88023 A | 5/2017 | |
| JP | 2017-100688 A | 6/2017 | |
| JP | 2017-100689 A | 6/2017 | |
| JP | 2017-193283 A | 10/2017 | |
| JP | 2017-196999 A | 11/2017 | |
| JP | 2017-206164 A | 11/2017 | |
| JP | 6426553 B2 * | 11/2018 | |
| JP | 2019018791 A * | 2/2019 | |
| JP | 2019218013 A * | 12/2019 | ............. B60N 2/427 |
| WO | WO-2019244763 A1 * | 12/2019 | ........... B60R 21/207 |

* cited by examiner

AIRBAG AND OCCUPANT RESTRAINT DEVICE

CROSS-REFERENCE TO RELATED APPLICATIONS

The present application is based upon and claims the benefit of priority from the prior Japanese Patent Application No. 2019-045015, filed on Mar. 12, 2019, and Japanese Patent Application No. 2019-065627, filed on Mar. 29, 2019, the entire contents of which are incorporated herein by reference.

TECHNICAL FIELD

The present invention relates to an airbag and an occupant restraint device for restraining an automobile occupant. More specifically, the present invention relates to an airbag that is installed in a seat back or the like in an automobile and that is inflated and deployed so as to surround the front part and side parts of an occupant in an emergency, such as a collision, and an occupant restraint device having this airbag.

BACKGROUND ART

PTL 1 (Japanese Patent Publication No. 2017-30373A) discloses an occupant restraint device in which an airbag is inflated and deployed so as to surround the front part and side parts of an occupant head in an emergency, such as collision, overturning, or the like of an automobile. The airbag of the occupant restraint device in PTL 1 includes: a flame duct that is inflated and deployed above the head of an occupant, as viewed in a seat width direction; a front inflatable section that is inflated and deployed in front of the occupant head by receiving the supply of gas from the flame duct; and a pair of side inflatable sections that are inflated and deployed on the sides of the occupant head by receiving the supply of gas from the flame duct or the front inflatable section.

When the airbag of the occupant restraint device in PTL 1 is inflated, the occupant head is surrounded on three sides, namely, the front and the sides of the seat, by the front inflatable section and the pair of side inflatable sections.

SUMMARY OF INVENTION

An object of the present invention is to provide: an airbag that is installed in a seat back or the like and includes a third inflatable section that is inflated in front of an occupant, and first and second inflatable sections that are inflated on the sides of the head of the occupant, front portions of the first and second inflatable sections extending in directions intersecting the vehicle front-rear direction, in front of the occupant head; and an occupant restraint device having the aforementioned airbag.

The present invention provides an airbag that is inflated and deployed from a seat back, a head rest, or an interior member behind the seat back of an automobile seat and that restrains an occupant of the seat, the airbag including first and second inflatable sections that are inflated and deployed on both sides of the head of the occupant, and a third inflatable section that is inflated and deployed in front of the chest of the occupant, an upper portion of the third inflatable section being continuous with front portions of the first and second inflatable sections, wherein surfaces of the front portions of the first inflatable section and the second inflatable section, the surfaces facing the occupant, have a triangular shape in plan view, and a main portion of a rear surface of the third inflatable section is flat.

In one embodiment of the present invention, the first inflatable section and the second inflatable section have intermediate portions between rear ends and the front portions, and the intermediate portions have such a vertical section in a vehicle width direction that a width of a lower portion is larger than a width of an upper portion.

An occupant restraint device of the present invention includes the airbag of the present invention and an inflator for inflating the airbag.

With the occupant restraint device of the present invention, because the front portions of the first and second inflatable sections have a triangular shape, the front portions of the first and second inflatable sections efficiently restrain the occupant head in a state of facing the occupant head or in a similar state in an offset collision or an oblique collision.

DESCRIPTION OF EMBODIMENTS

Referring to FIGS. 1 to 6, an airbag and an occupant restraint device according to an embodiment will be described. In the description below, the front and rear and the left and right correspond to the front and rear and the left and right of an automobile.

An airbag 1 includes: a first inflatable section 10 that is inflated and deployed forward from the upper portion of a seat back S through the left side of a head H of an occupant P; a second inflatable section 20 that is inflated and deployed forward from the upper portion of the seat back S through the right side of the head H of the occupant P; and a third inflatable section 30 that is continuous with lower portions of front portions 10$f$ and 20$f$ of the first inflatable section 10 and the second inflatable section 20 and that is inflated and deployed in front of the chest of the occupant P.

Figure 1:
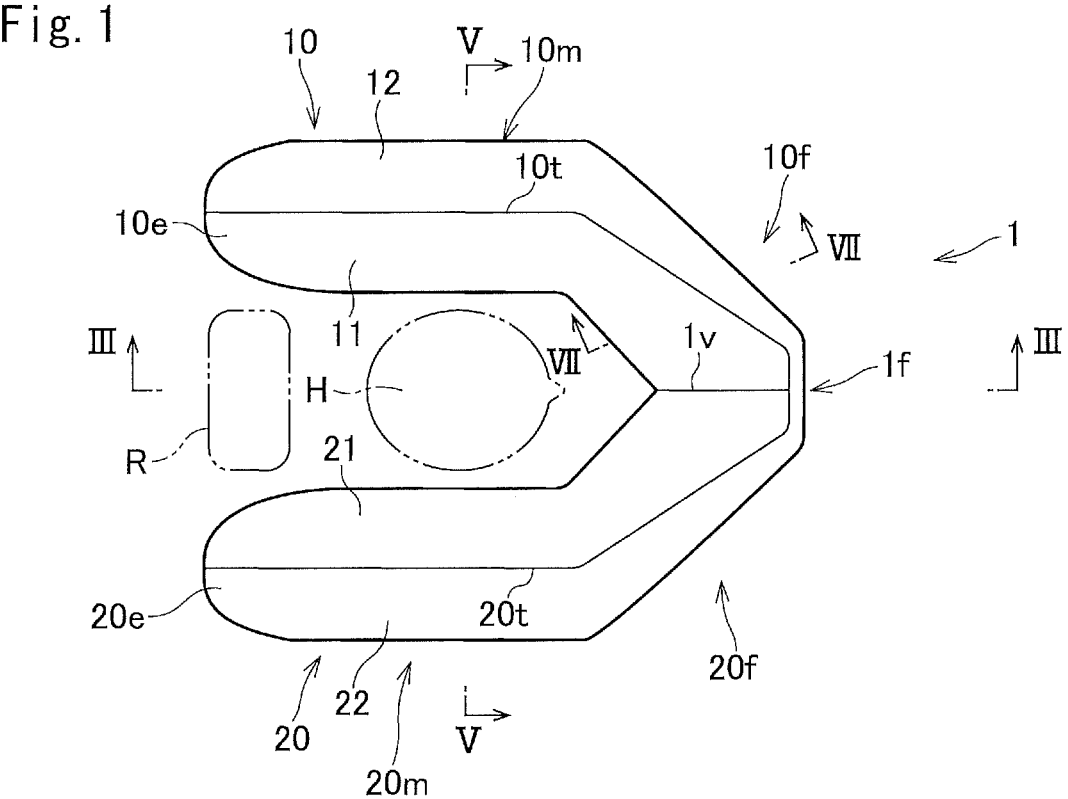
FIG. 1 is a plan view of an inflated airbag according to an embodiment.
Figure 2:
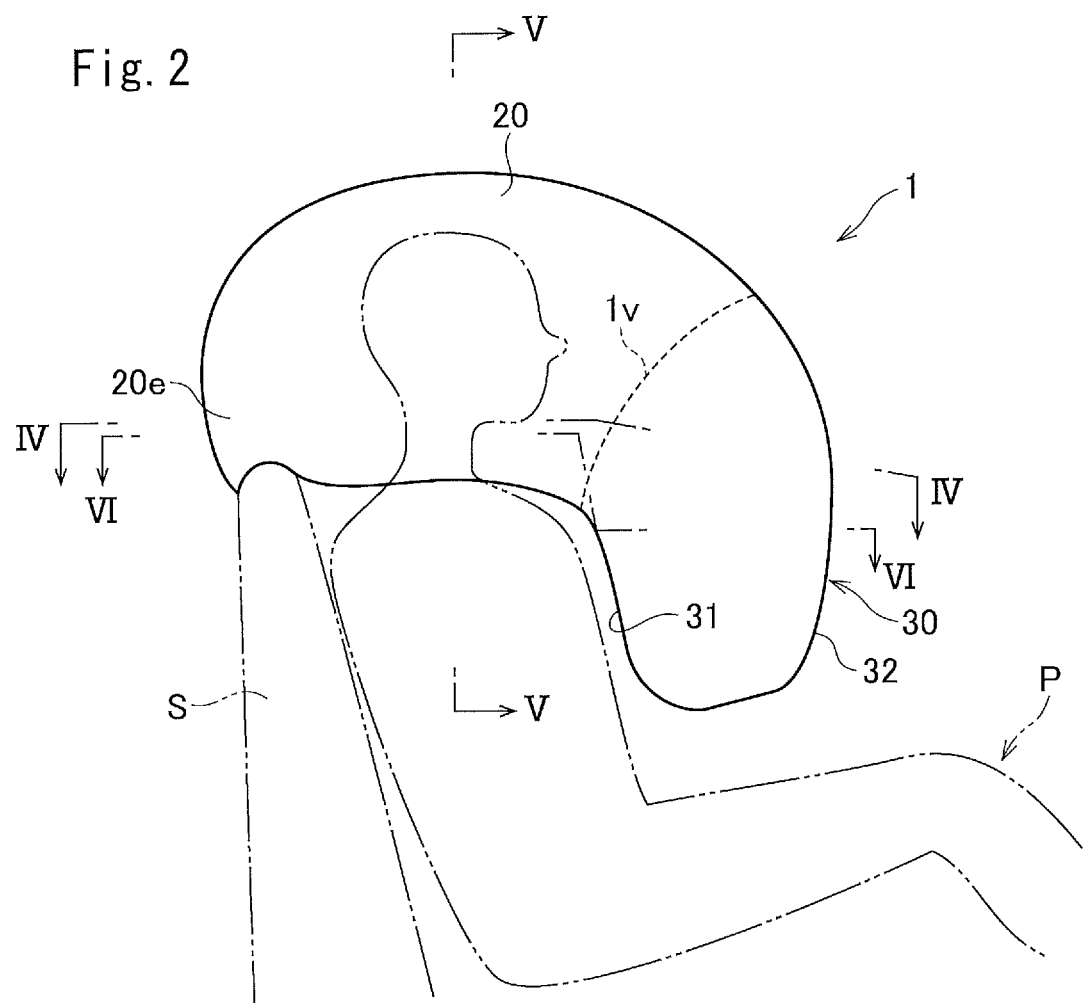
FIG. 2 is a side view of the inflated airbag according to the embodiment.
Figure 3:
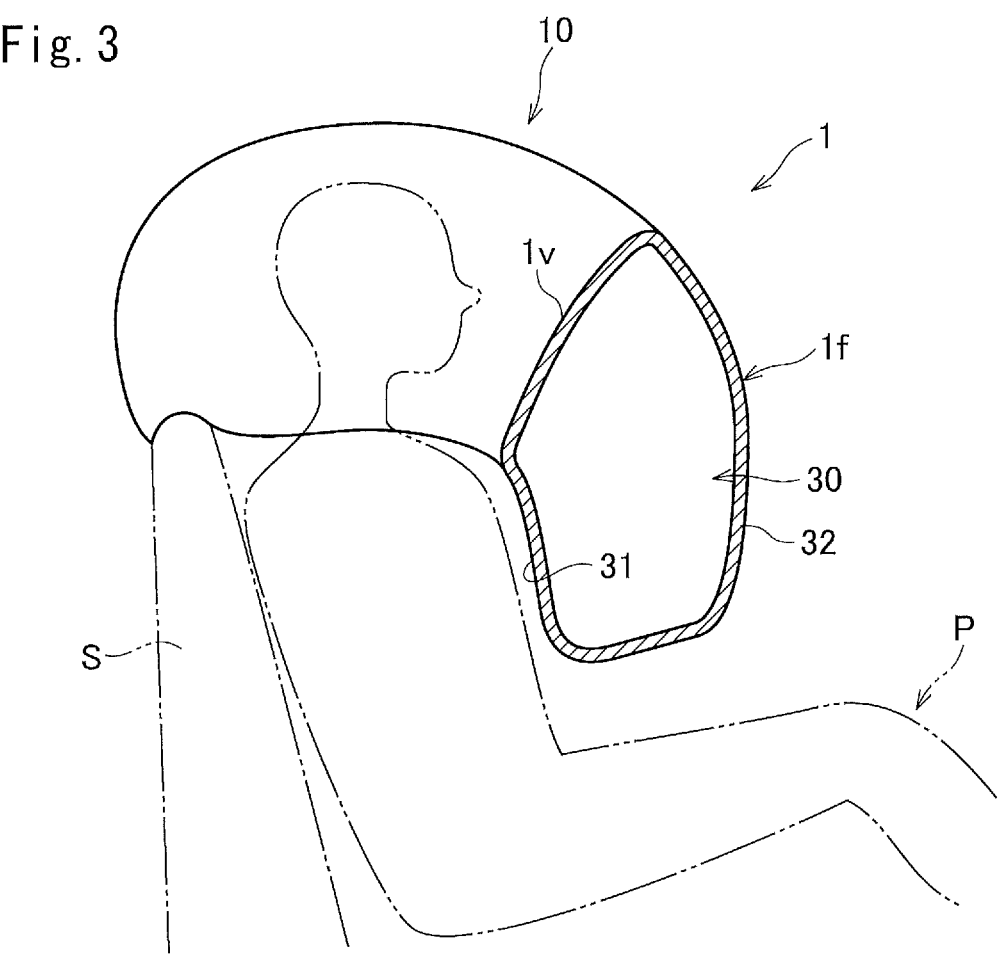
FIG. 3 is a sectional view taken along line III-III in FIG. 1.
Figure 4:
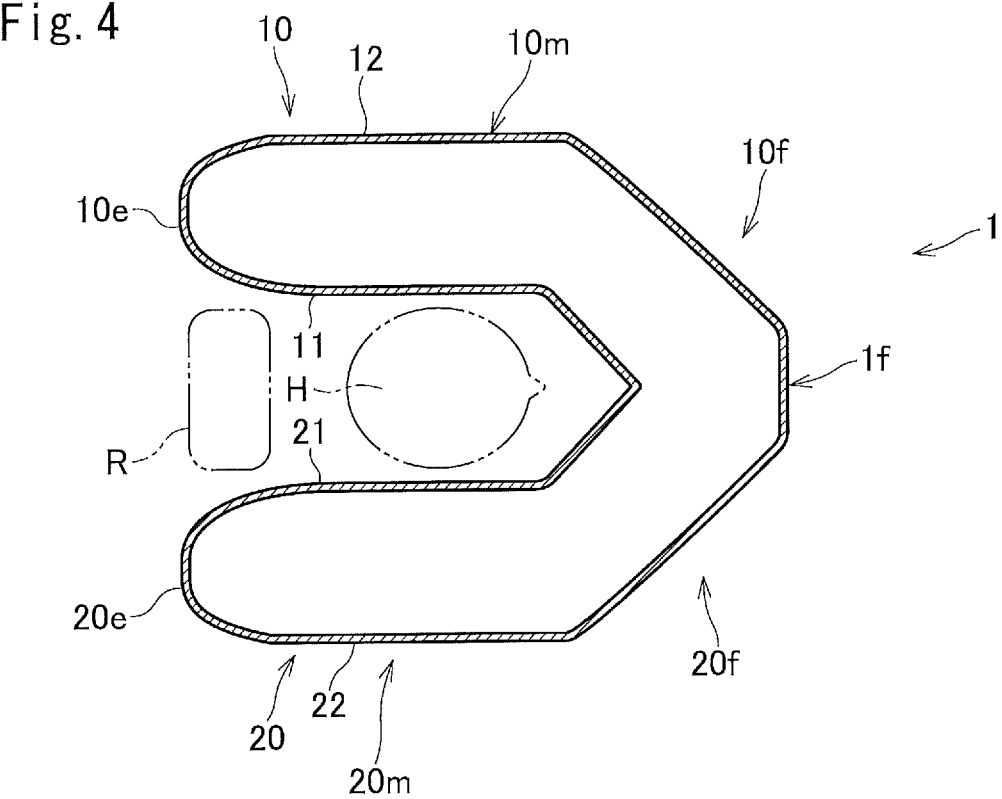
FIG. 4 is a sectional view taken along line IV-IV in FIG. 2.

Occupant-facing surfaces of the front portions 10$f$ and 20$f$ of the first and second inflatable sections 10 and 20 and a virtual line connecting between intermediate portions of the occupant-facing surfaces of the front portions 10$f$ and 20$f$ and parallel to the vehicle width direction form a triangular shape in plan view (FIG. 1). The ends of the triangle may be rounded. In other words, the occupant-facing surfaces of the front portions 10$f$ and 20$f$ of the first and second inflatable sections 10 and 20 form a V shape in plan view (FIG. 1).

The first inflatable section 10 and the second inflatable section 20 includes rear ends 10$e$ and 20$e$, front portions 10$f$ and 20$f$, and intermediate portions 10$m$ and 20$m$ between the rear ends 10$e$ and 20$e$ and the front portions 10$f$ and 20$f$. The intermediate portions 10$m$ and 20$m$ extend in the vehicle front-rear direction. The intermediate portions 10*m* and 20*m* are substantially parallel to each other.

The front portions 10*f* and 20*f* extend in directions intersecting the vehicle front-rear direction so as to be closer to each other toward the front side. The front portions 10*f* and 20*f* meet each other at a front end 1*f* of the airbag 1.

The first inflatable section 10 and the second inflatable section 20 include first surfaces 11 and 21 facing the occupant head H, and second surfaces 12 and 22 facing away from the occupant. The first inflatable section 10 and the second inflatable section 20 further have bottom surfaces 13 and 23 in the intermediate portions 10*m* and 20*m*.

Figure 5:
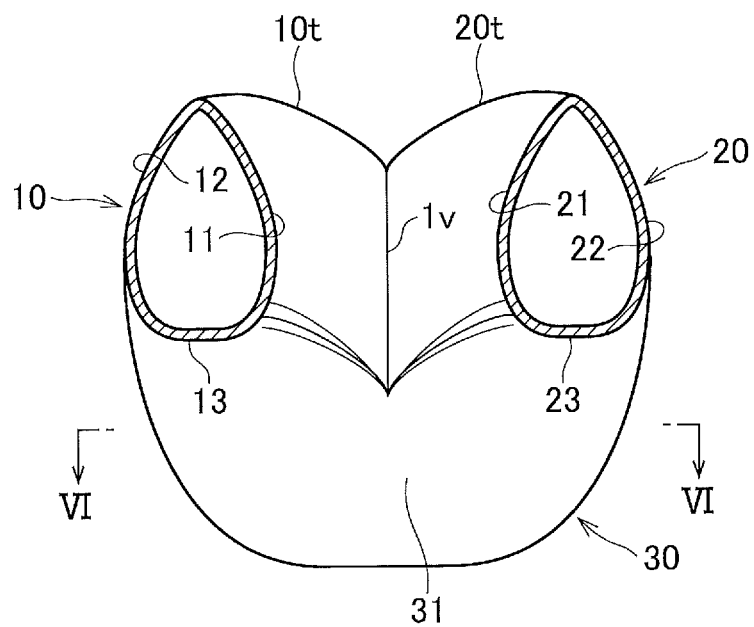
FIG. 5 is a sectional view taken along line V-V in FIGS. 1 and 2.
Figure 6:
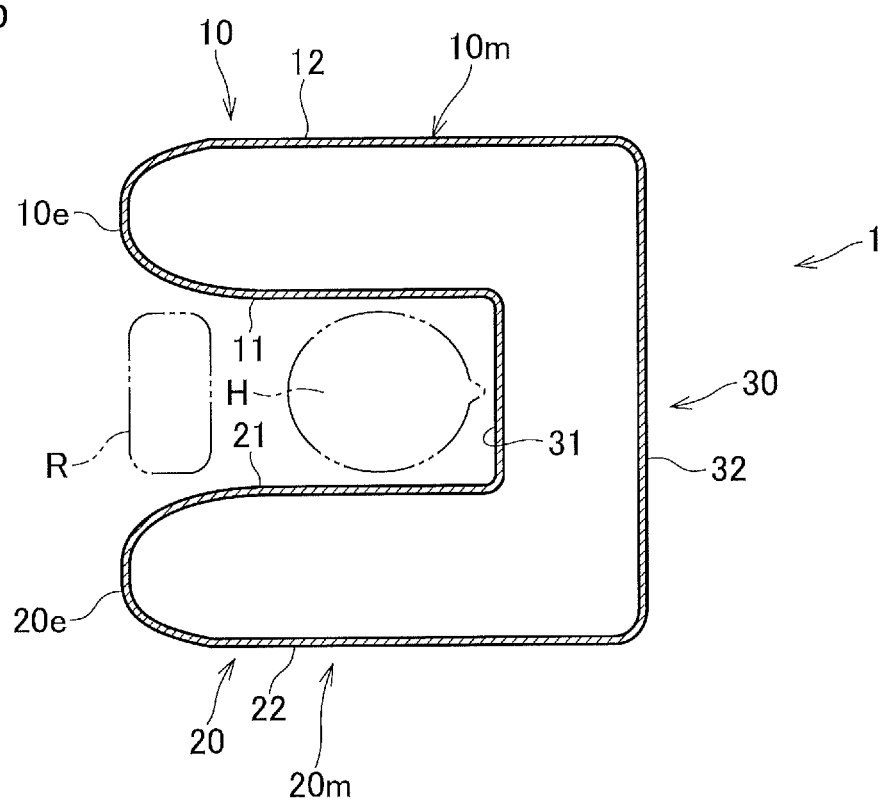
FIG. 6 is a sectional view taken along line VI-VI in FIG. 5.
Figure 7:
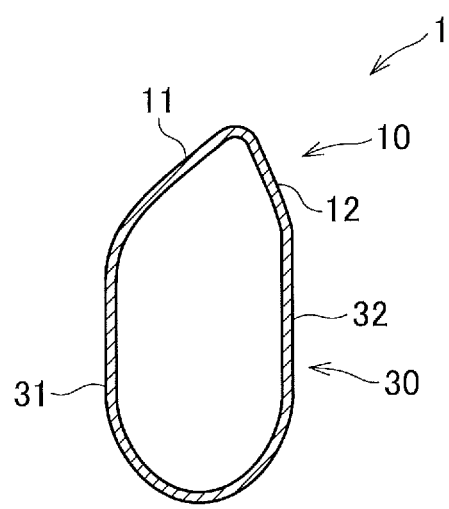
FIG. 7 illustrates an end face of a section taken along line VII-VII in FIG. 1.

The first surfaces 11 and 21 and the second surfaces 12 and 22 are closer to each other toward the top and meet each other at the upper end to form top edges 10*t* and 20*t*. In the intermediate portions 10*m* and 20*m*, the top edges 10*t* and 20*t* are located in the middle of the first inflatable section 10 and the second inflatable section 20 in the left-right direction. As shown in FIG. 5, in a vertical section in the vehicle width direction, the intermediate portions 10*m* and 20*m* have a substantially isosceles triangle shape, in which the width of the lower portion is larger than the width of the upper portion.

In plan view (FIG. 1), the top edges 10*t* and 20*t* of the front portions 10*f* and 20*f* are closer to the outer circumference of the airbag 1 toward the front side. The first surfaces 11 and 21 of the front portions 10*f* and 20*f* are inclined so as to be higher at portions farther from the occupant head H.

The first surfaces 11 and 21 of the first inflatable section 10 and the second inflatable section 20 meet at the front portion of the airbag 1, and this meeting portion serves as a valley edge 1*v* extending in the front-rear direction.

The third inflatable section 30 has a rear surface 31 on the occupant side and a front surface 32 on the non-occupant side, that is, on the front side. The rear surface 31 and the front surface 32 meet at the left edge, right edge, and the lower edge of the third inflatable section 30. The upper portion of the rear surface 31 is continuous with the lower portions of the first surfaces 11 and 21 of the front portions 10*f* and 20*f*. The upper portion of the front surface 32 is continuous with the lower portions of the second surfaces 12 and 22 of the front portions 10*f* and 20*f*.

The third inflatable section 30 is provided with a tether (not shown) for maintaining its inflation thickness (that is, the distance between the rear surface 31 and the front surface 32) at a predetermined distance, whereby a main portion (other than the side edge portions and the lower edge portion) of the rear surface 31 becomes flat at an inflated state.

A vent hole (not shown) is provided in the airbag 1.

Ends of gas introducing pipes (not shown) are inserted into the rear portions of the first inflatable section 10 and the second inflatable section 20.

The thus-configured airbag 1 is folded and stored in a retainer (not shown). An inflator is installed in the retainer, so that gas can be introduced into the airbag 1 through the gas introducing pipes.

The retainer accommodating the airbag 1 is installed in the upper portion of the seat back S and is covered by a seat-back covering material. The seat-back covering material has tearable slits (not shown) that can be torn when the airbag 1 is inflated.

When a collision, overturning, or the like of an automobile is detected, the inflator is actuated, and the airbag 1 starts to be inflated. The airbag 1 pushes and breaks the tearable slits and is inflated and deployed first upward from the upper portion of the seat back S. Next, the first and second inflatable sections 10 and 20 are inflated and deployed forward above the occupant head H, and then the third inflatable section 30 is inflated and deployed downward in front of the occupant head H. At the same time, or before or after that, the first and second inflatable sections 10 and 20 descend to the sides of the head H.

The final deployed shape of the airbag 1 is shown in FIGS. 1 to 7. The third inflatable section 30 of the airbag 1 in this final deployed shape is located in front of the chest of the occupant P. Because the main portion of the rear surface 31 of the third inflatable section 30 is a flat surface facing the occupant chest, the contact area with the chest is large, and thus, the load is distributed. The first and second inflatable sections 10 and 20 extend on the left and right sides of the occupant head H and connect between the third inflatable section 30 and the upper portion of the seat back S. In this embodiment, the front portions 10*f* and 20*f* of the first and second inflatable sections 10 and 20 are located obliquely in front of the occupant head H, on the left and right sides.

When the automobile experiences a forward collision, the head H of the occupant P is restrained by the front portions 10*f* and 20*f* near the valley edge 1*v*, and the chest is restrained by the third inflatable section 30.

When the automobile experiences an offset collision or an oblique collision, the occupant head H is restrained by the front portion 10*f* or 20*f*, and the chest is restrained by the third inflatable section 30. This way, even in the case where the automobile experiences an offset collision or an oblique collision, the occupant head H is restrained by the single airbag 1. In an offset collision or an oblique collision, the occupant head moves obliquely forward. Because the front portions 10*f* and 20*f* extend in directions intersecting the vehicle front-rear direction, the occupant head H is restrained by the front portion 10*f* or 20*f* so as to substantially directly face the front portion 10*f* or 20*f*.

The above-described embodiment is an example of the present invention, and the present invention may be implemented in a way other than illustrated. For example, although the airbag 1 does not have an overhead inflatable section that covers the upper side of the occupant head H, such an inflatable section may be provided. Furthermore, in the present invention, the airbag may be installed so as to be inflated and deployed from an interior member behind the seat back.

The invention claimed is:

1. An airbag that is inflated and deployed from a seat back, a head rest, or an interior member behind the seat back of an automobile seat and that restrains an occupant of the seat, the airbag comprising first and second inflatable sections that are inflated and deployed on both sides of the head of the occupant, and a third inflatable section that is inflated and deployed in front of the chest of the occupant, an upper portion of the third inflatable section being continuous with front portions of the first and second inflatable sections, wherein occupant-facing surfaces of the front portions of the first inflatable section and the second inflatable section, the occupant-facing surfaces facing the occupant, extend in directions intersecting a vehicle front-rear direction;

the occupant-facing surfaces of the front portions of the first inflatable section and the second inflatable section and a virtual line, which connects intermediate portions of the occupant-facing surfaces and is parallel to a vehicle width direction, form a triangular shape in plan view, and a main portion of a rear surface of the third inflatable section is flat.

2. The airbag according to claim 1, wherein
the first inflatable section and the second inflatable section have intermediate portions between rear ends and the front portions, and,
the intermediate portions have such a vertical section in a vehicle width direction that a width of a lower portion is larger than a width of an upper portion.

3. An occupant restraint device comprising the airbag according to claim 1 and an inflator for inflating the airbag.

4. An occupant restraint device comprising the airbag according to claim 2 and an inflator for inflating the airbag.

* * * * *